May 7, 1957 — D. MULLAN ET AL — 2,791,316
TRANSFER DEVICE FOR HIGH SPEED INCANDESCENT LAMP FINISHING MACHINE
Original Filed Aug. 12, 1954 — 12 Sheets-Sheet 1

INVENTORS.
DANIEL MULLAN
EDWARD ZILAHY
ATTORNEY

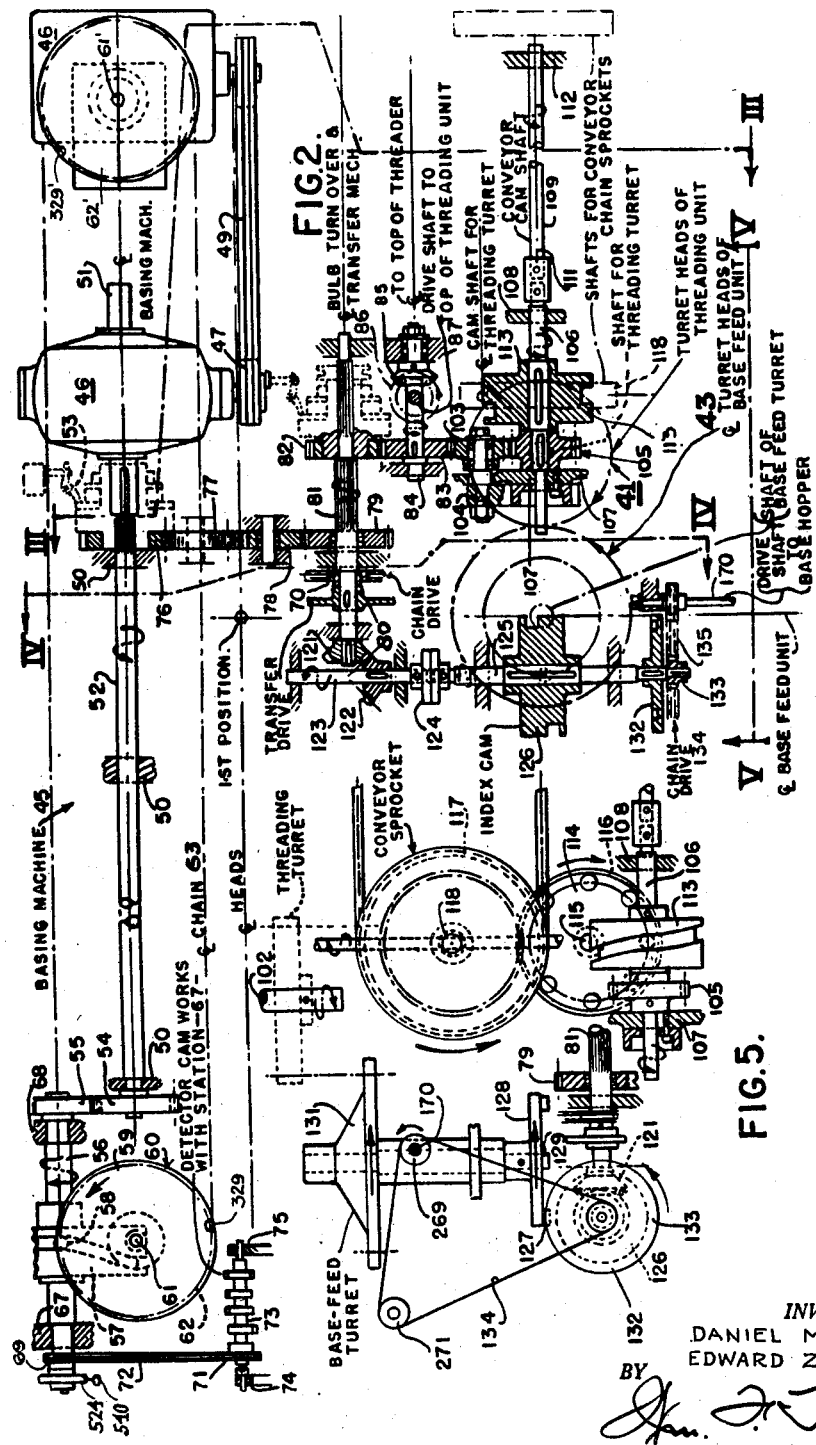

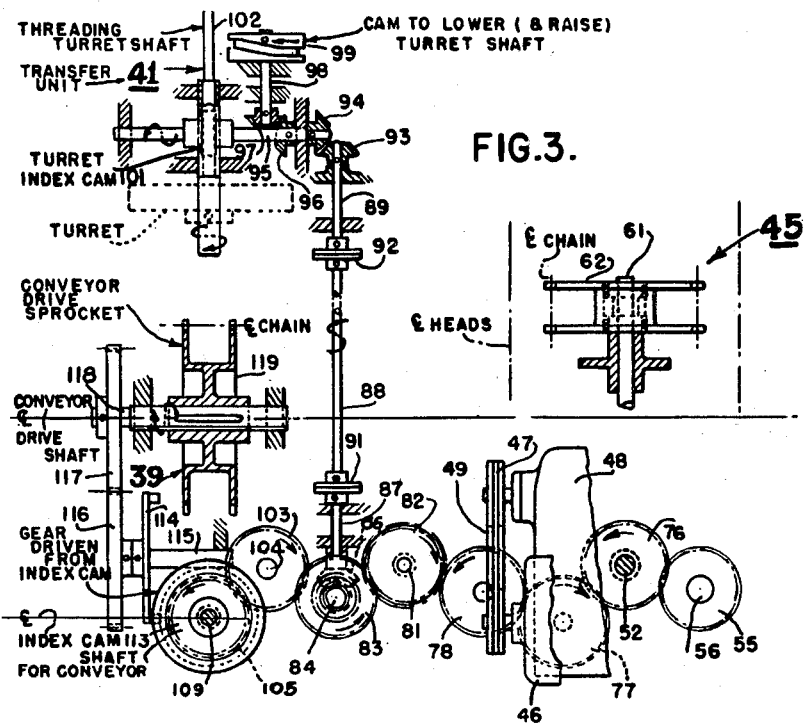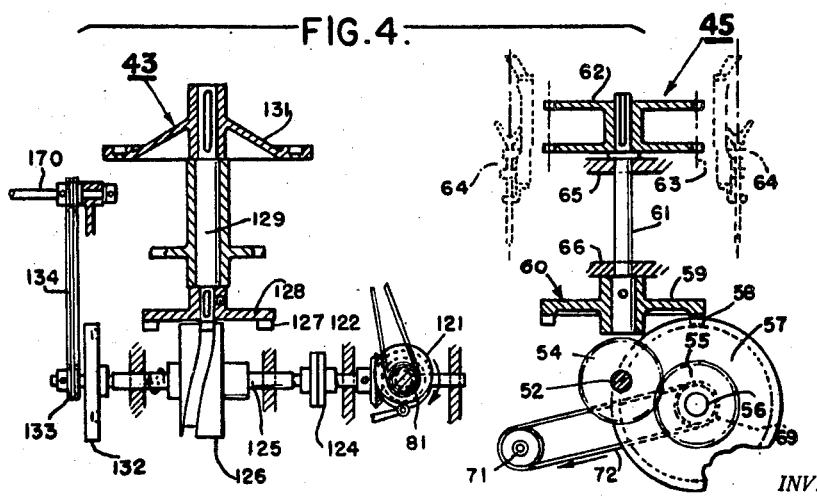

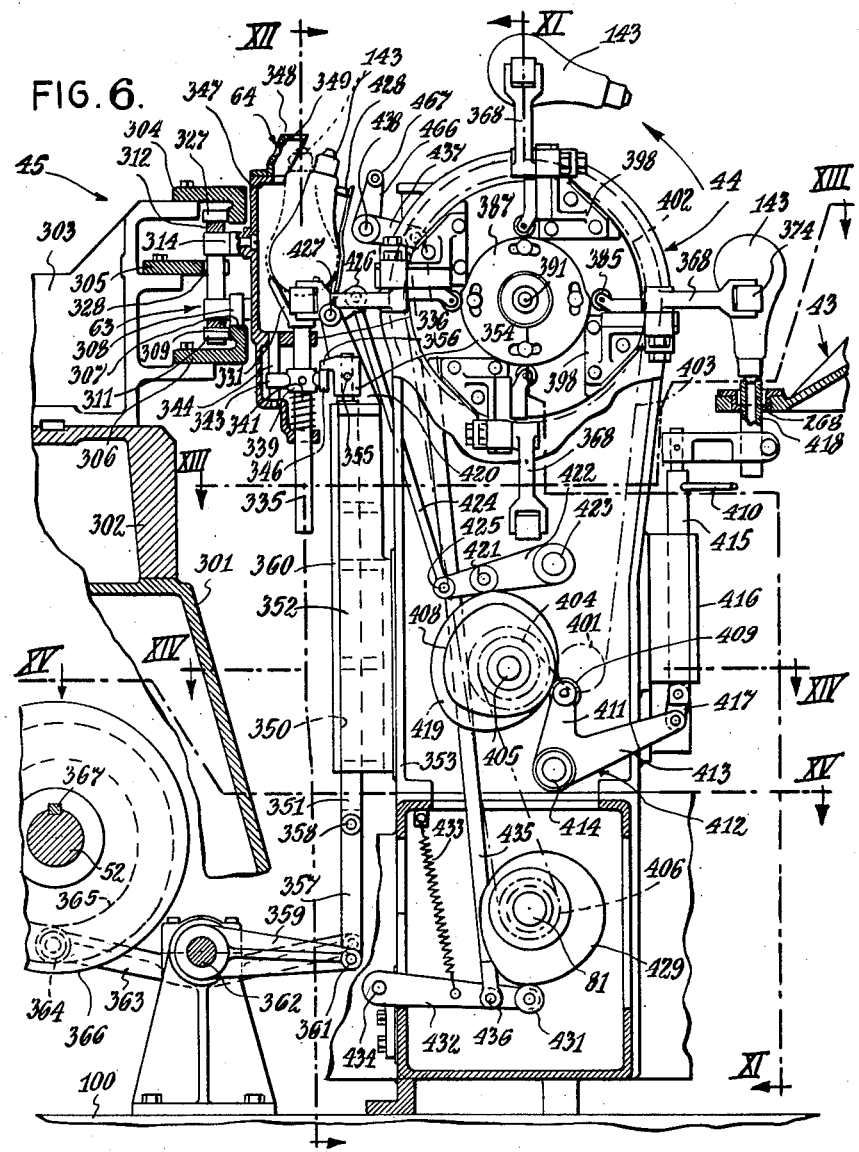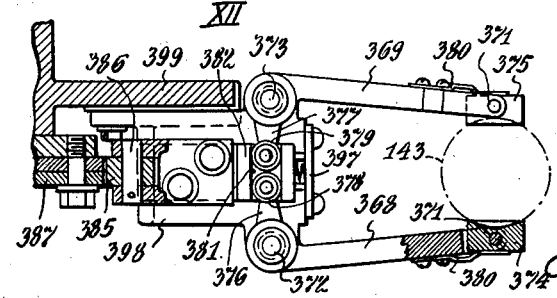

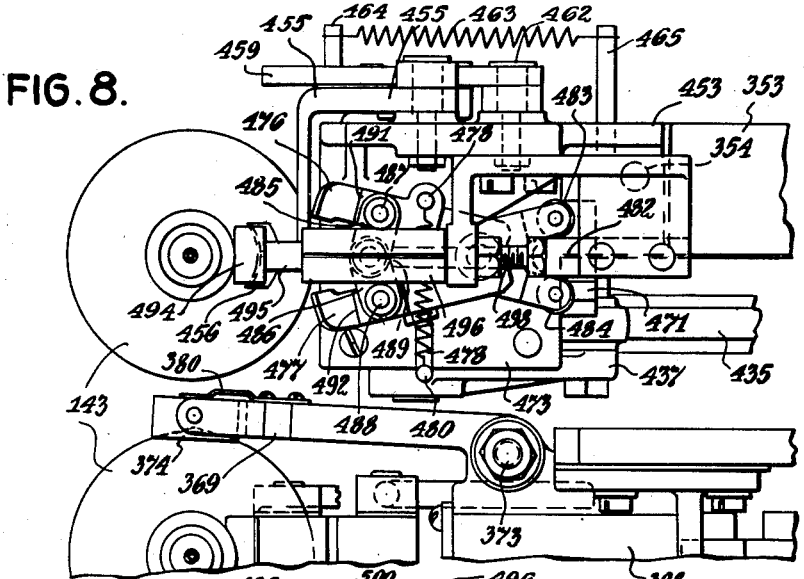
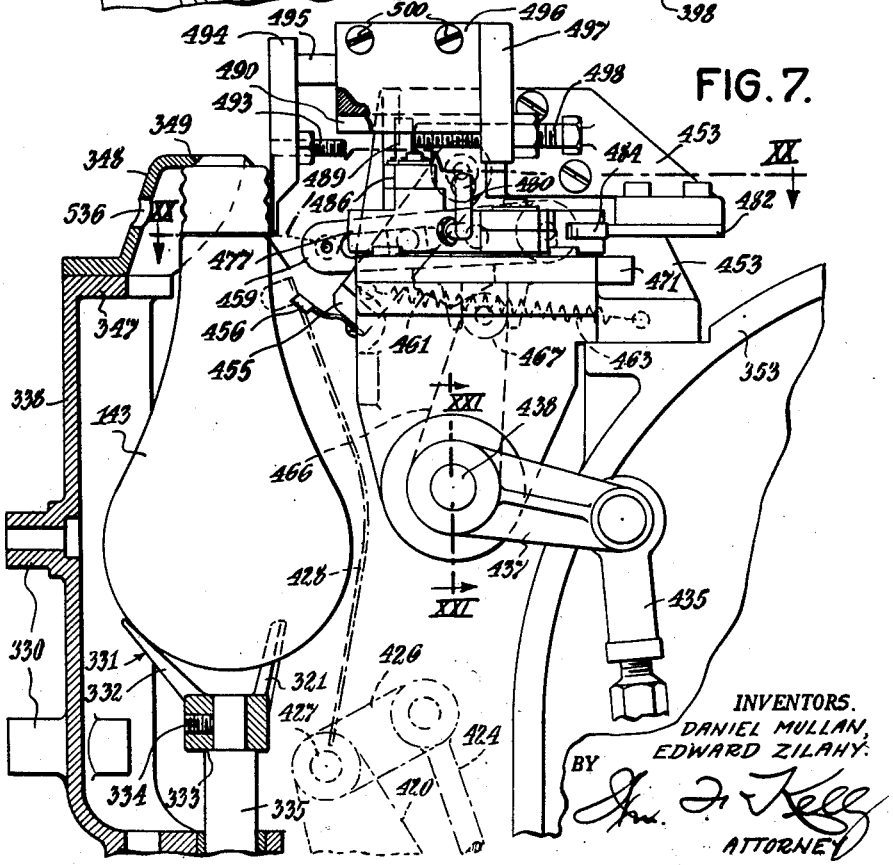

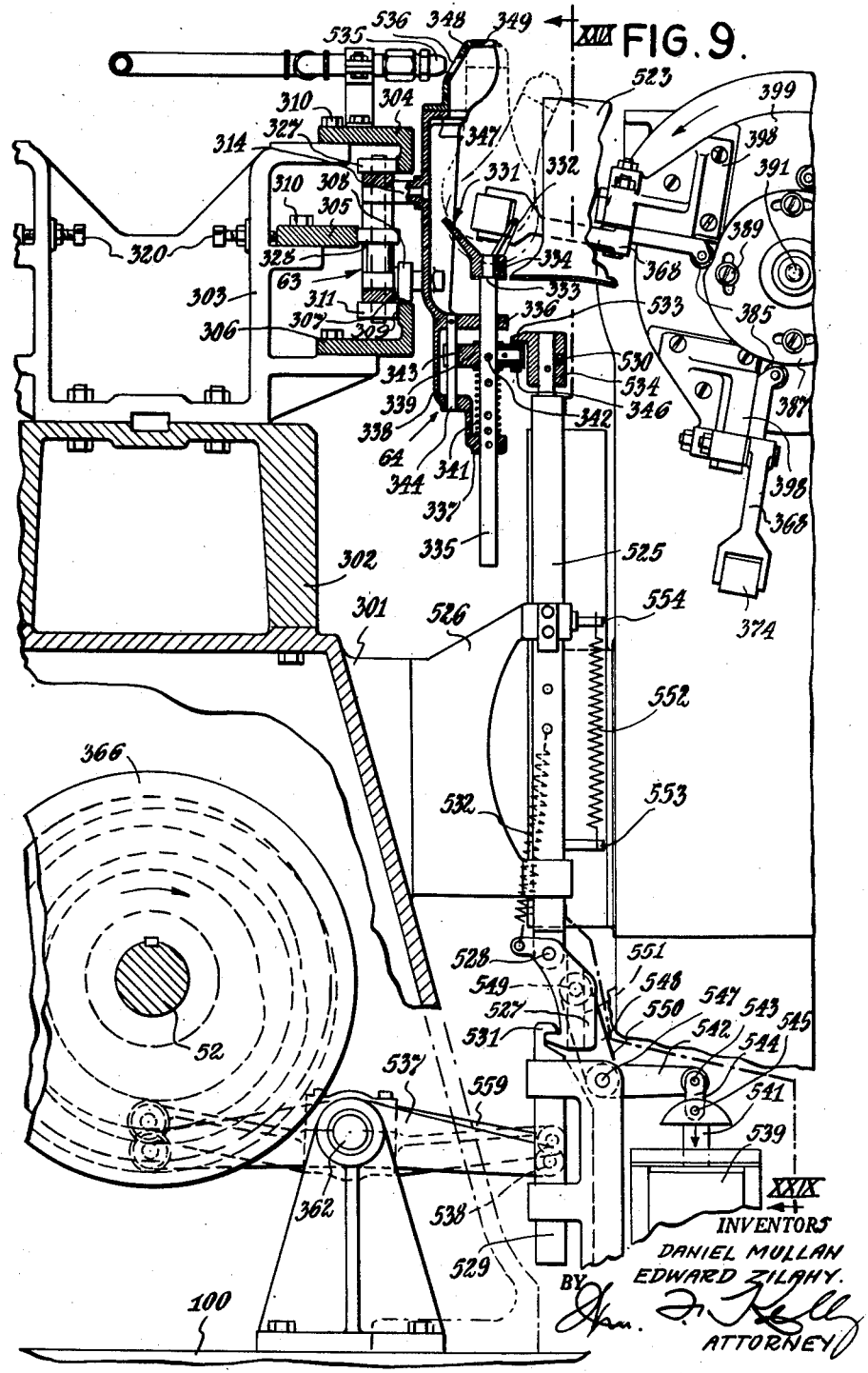

INVENTORS,
DANIEL MULLAN,
EDWARD ZILAHY.
BY
ATTORNEY.

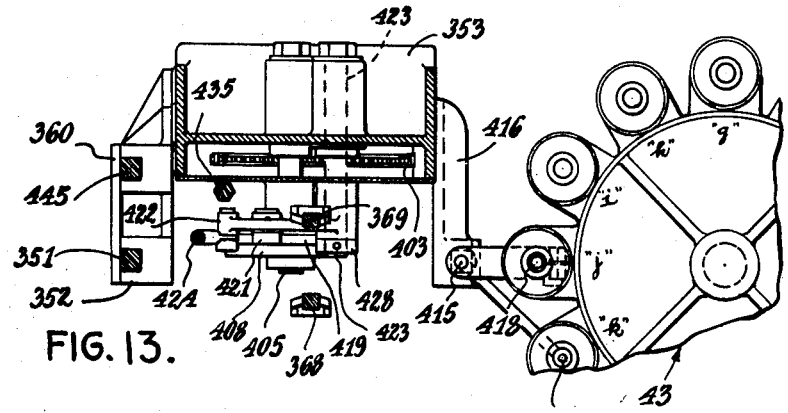
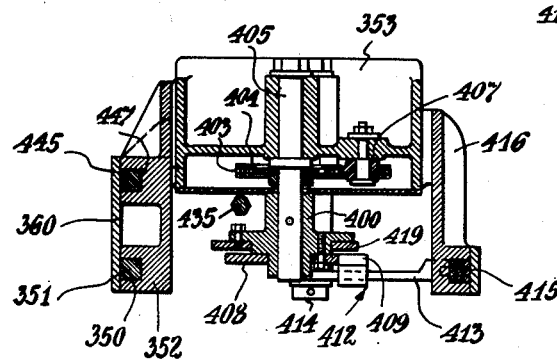
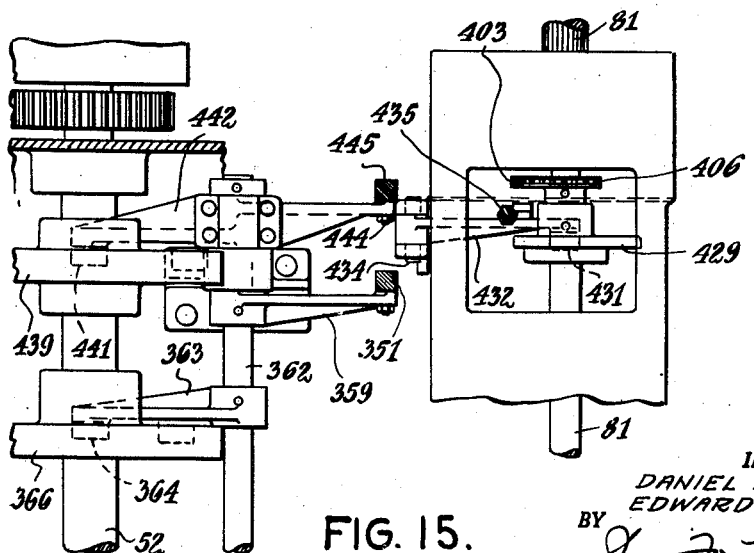

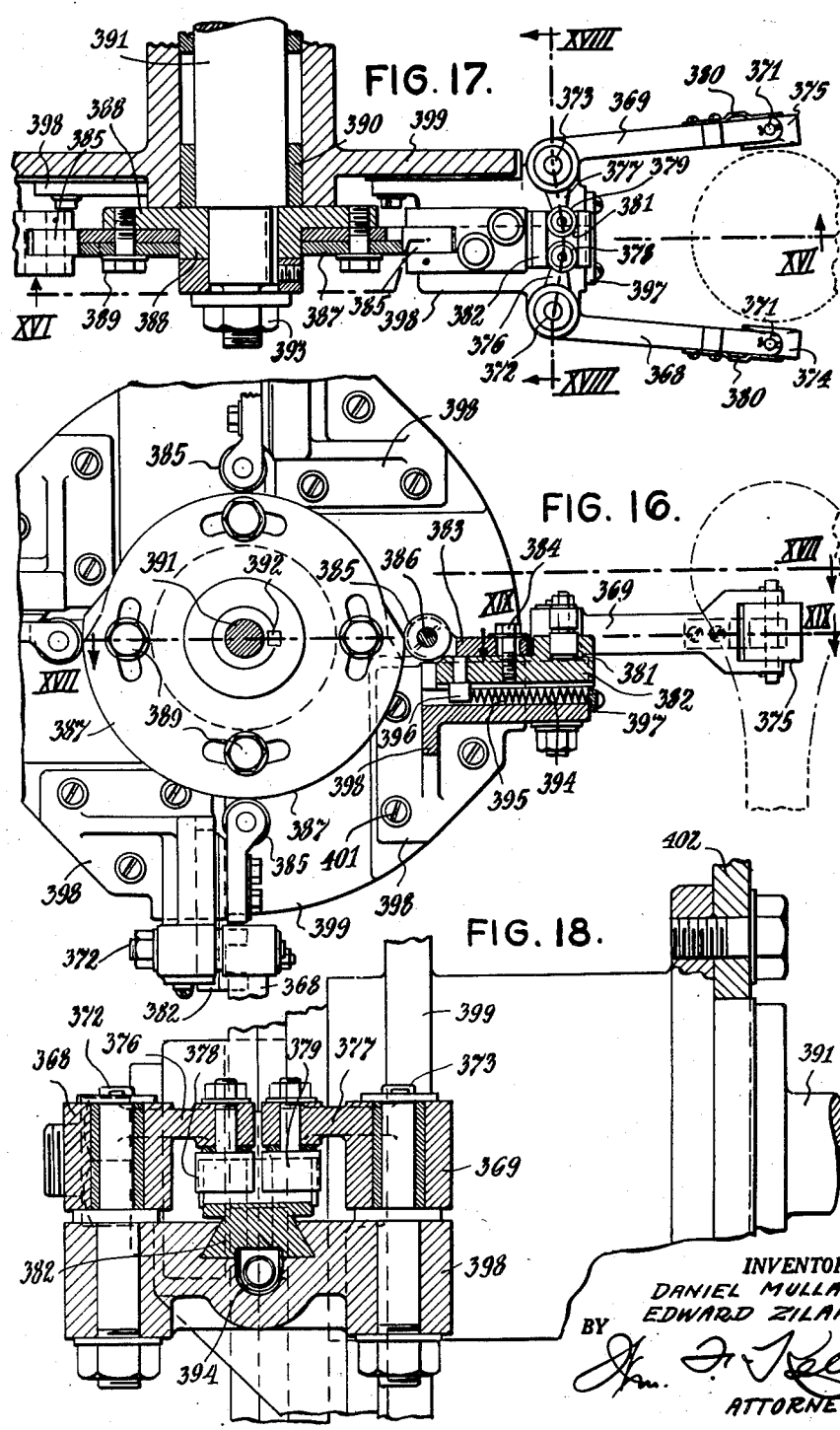

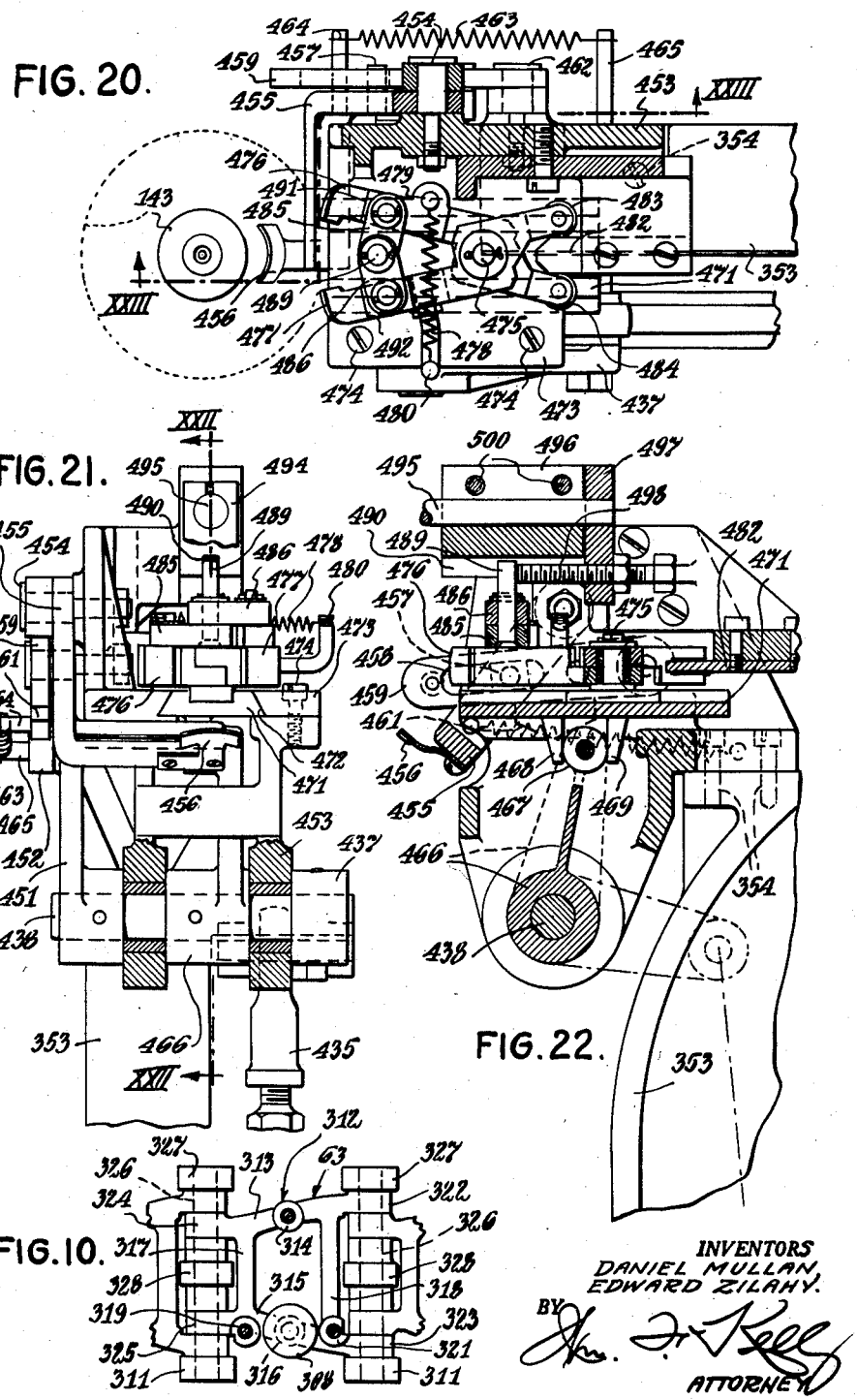

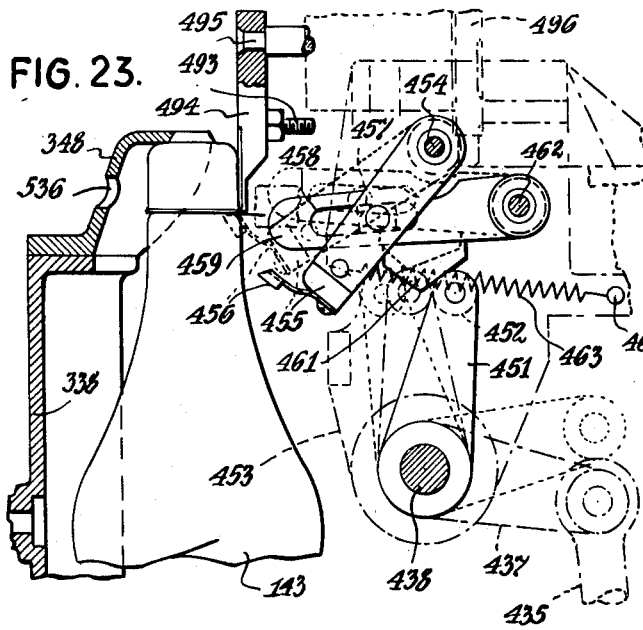
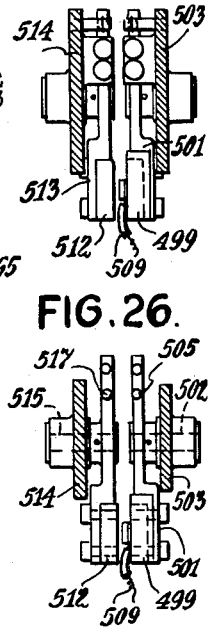
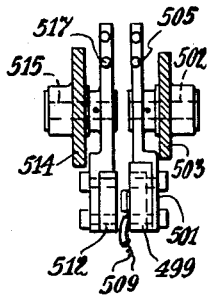
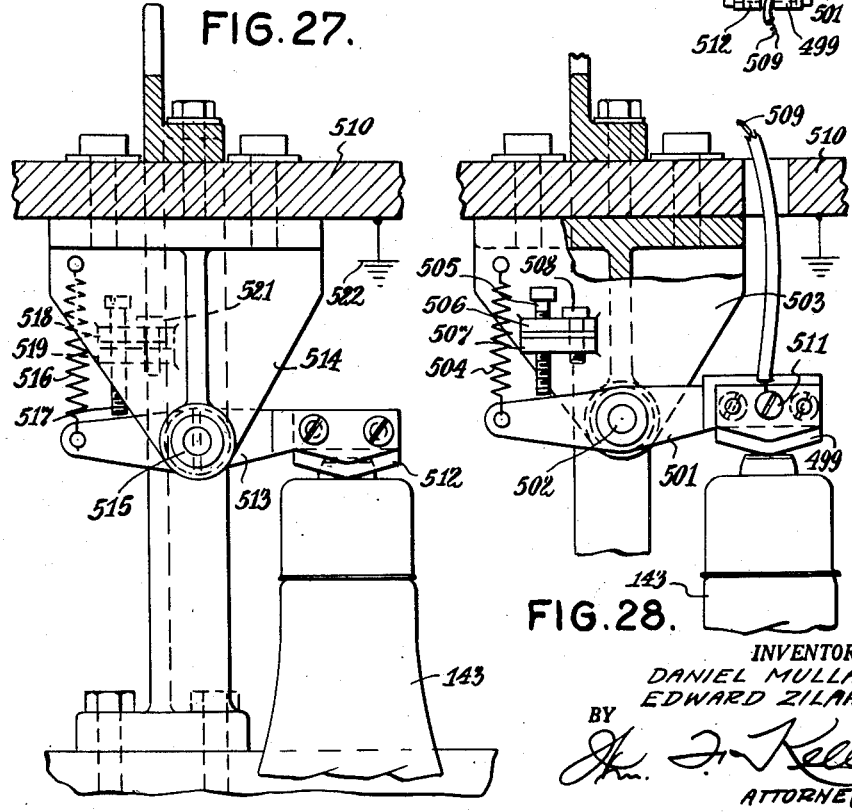

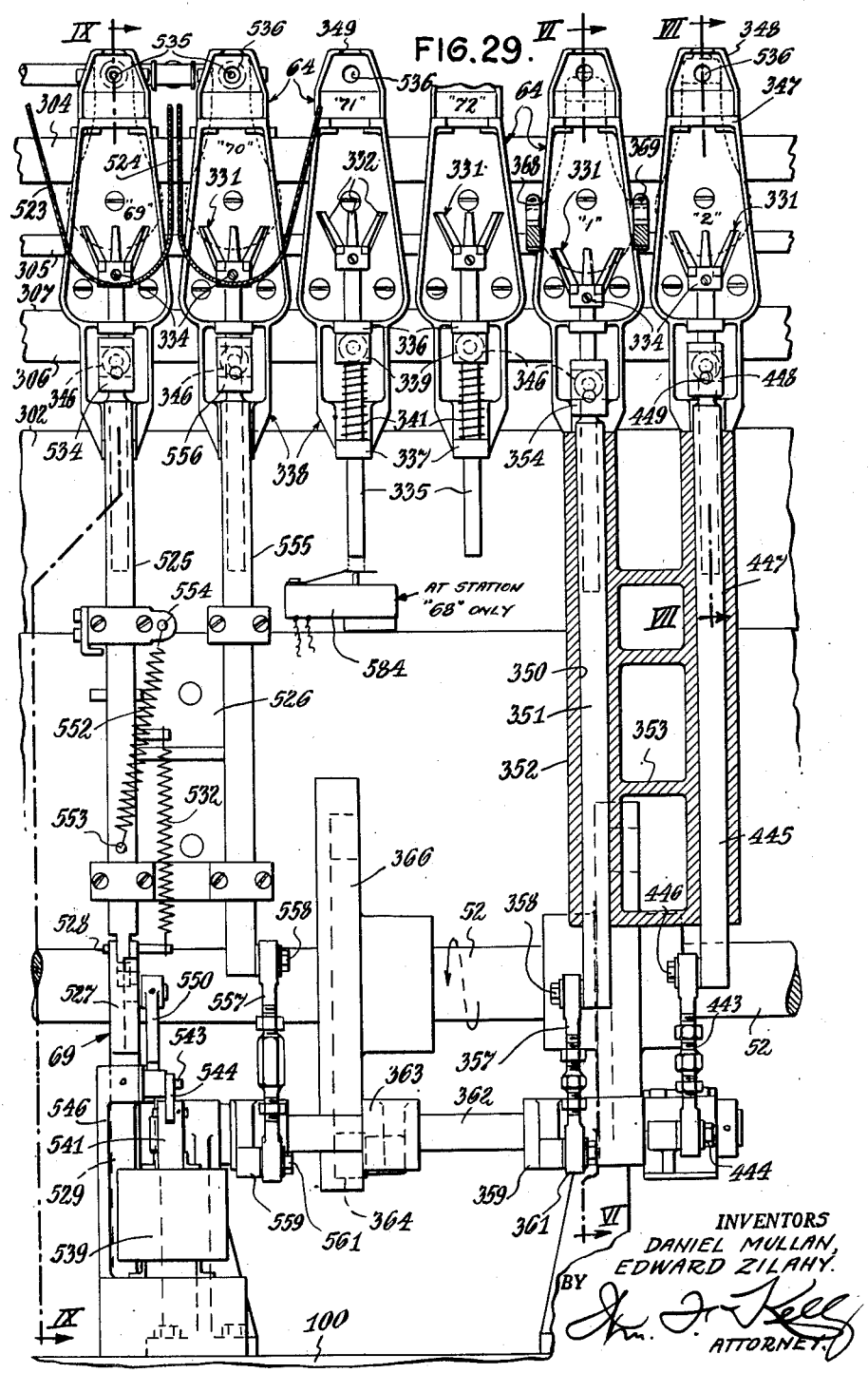

United States Patent Office 2,791,316
Patented May 7, 1957

2,791,316

TRANSFER DEVICE FOR HIGH SPEED INCANDESCENT LAMP FINISHING MACHINE

Daniel Mullan, Hillside, and Edward Zilahy, Nutley, N. J., assignors to Westinghouse Electric Corporation, East Pittsburgh, Pa., a corporation of Pennsylvania Original application August 12, 1954, Serial No. 449,482. Divided and this application June 14, 1955, Serial No. 517,585

4 Claims. (Cl. 198—33)

This application is a division of application Serial No. 449,482 filed August 12, 1954.

This invention relates to lamp-making machines and, more particularly, to a transfer device for a machine adapted to automatically make lamps at high production speed.

An object of our invention, generally considered, is to automatically assemble the parts of a lamp, unite them, test the lamps, and separate the good lamps from the bad.

Another object of our invention is to arrange the stem and mounting machine, the sealing machine, the exhaust machine, and the basing machine, together with the feeding and transferring mechanisms, so that all operate as a unit for the manufacture of incandescent electric lamps from the several parts thereof.

A further object of our invention is to automatically effect the high speed manufacture of incandescent electric lamps with a minimum of operators and supervision.

A still further object of our invention is to transfer bulbs from the lead-wire straightening and base threading and assembling of the machine to the basing portion thereof for completion and testing of the lamps.

Other objects and advantages of the invention will become apparent as the description proceeds.

Referring to the drawing:

Fig. 2 is a diagrammatic plan, with parts in horizontal section, of the driving mechanism for the group.

Fig. 3 is a diagrammatic elevational view, with parts in vertical section on the line III—III of Fig. 2, in the direction of the arrows.

Fig. 4 is a vertical sectional view on the line IV—IV of Fig. 2, in the direction of the arrows.

Fig. 5 is an elevational view, with parts in vertical section on the line V—V of Fig. 2, in the direction of the arrows.

Fig. 6 is a vertical sectional view of the machine, on the lines VI—VI of Figs. 1 and 29, in the direction of the arrows, particularly showing the device for picking up, turning over, and feeding lamps to a head at station "1" of the basing machine and preliminarily aligning such lamps.

Fig. 7 is an elevational view with parts in transverse section on the line VII—VII of Fig. 29, in the direction of the arrows, showing the lamp final alignment mechanism in its open position at station "2," but after the alignment operation has been accomplished, and also showing parts involved in the preliminary alignment at station "1."

Fig. 8 is a fragmentary plan of parts of the machine shown in Fig. 7.

Fig. 9 is a transverse sectional view on the line IX—IX of Fig. 29, in the direction of the arrows, showing the mechanism at station "69" where good lamps are discharged.

Fig. 10 is a detailed front elevational view of one of the links of the basing machine conveyor chain, illustrated in transverse section in Figs. 6 and 9.

Fig. 13 is a fragmentary plan of the machine with parts in horizontal section on the line XIII—XIII of Fig. 6, in the direction of the arrows.

Fig. 14 is a fragmentary horizontal sectional view on the line XIV—XIV of Fig. 6, in the direction of the arrows.

Fig. 15 is a fragmentary plan of a lower portion of the machine, with parts in horizontal section on the line XV—XV of Fig. 6, in the direction of the arrows.

Fig. 16 is a fragmentary elevational view of the lamp transfer and turnover head mechanism, with parts in section on the line XVI—XVI of Fig. 17, in the direction of the arrows.

Fig. 17 is a horizontal sectional view on the line XVII—XVII of Fig. 16, in the direction of the arrows.

Fig. 18 is an enlarged vertical sectional view on the line XVIII—XVIII of Fig. 17, in the direction of the arrows.

Fig. 19 is a fragmentary horizontal sectional view, generally corresponding with a portion of Fig. 17, but on the line XIX—XIX of Fig. 16, in the direction of the arrows.

Fig. 20 is a horizontal sectional view on the line XX—XX of Fig. 7, in the direction of the arrows.

Fig. 21 is an elevational view from the left, of parts shown in Fig. 7, with portions broken away for better illustration, and parts in section on the line XXI—XXI of said figure, in the direction of the arrows.

Fig. 22 is a transverse sectional view on the line XXII—XXII of Fig. 21, in the direction of the arrows.

Fig. 23 is a vertical sectional view on the line XXIII—XXIII of Fig. 20, particularly showing the alignment means with its levers and linkage.

Fig. 25 is a horizontal sectional view on the line XXV—XXV of Fig. 24, in the direction of the arrows.

Fig. 26 is a horizontal sectional view on the line XXVI—XXVI of Fig. 24, in the direction of the arrows.

Fig. 27 is a side elevational view showing the grounded member of the flashing circuit, with parts in section on the line XXVII—XXVII of Fig. 24, in the direction of the arrows, but on a larger scale.

Fig. 28 is a view similar to Fig. 27, but showing the power-connected member of the flashing circuit with parts in section on the line XXVIII—XXVIII of Fig. 24, in the direction of the arrows.

Fig. 29 is a side elevational view, of the machine showing the mechanism which operates the lamp holders to discharge a good finished lamp and an inoperative finished lamp, to load an unfinished lamp for processing, and to hold an unfinished lamp during the final alignment for processing, with parts in section on the line XXIX—XXIX of Fig. 9, in the direction of the arrows.

Figure 1:
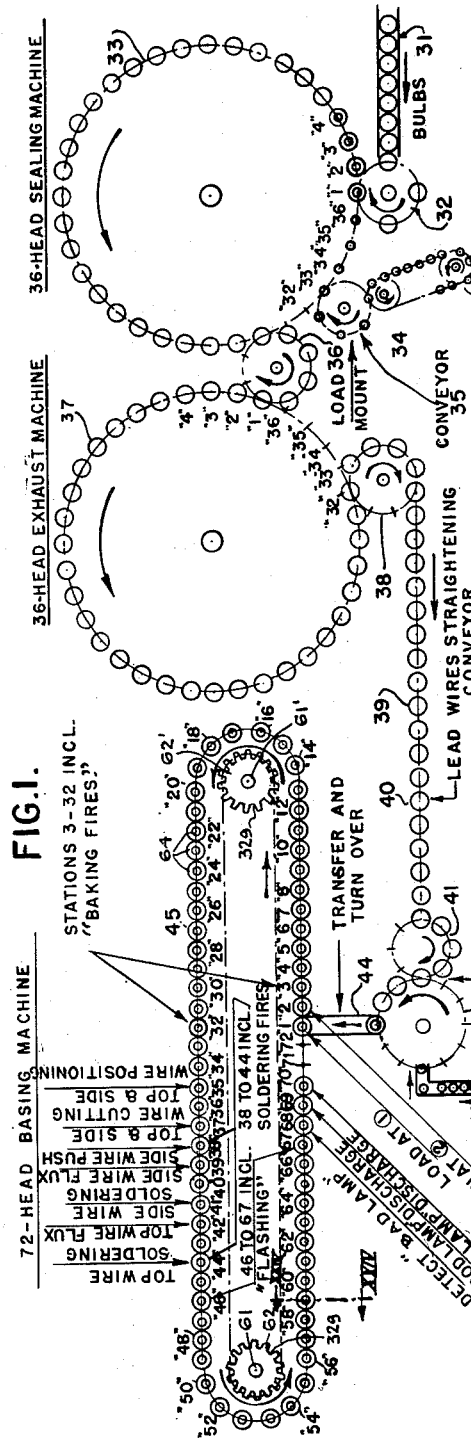
Fig. 1 is a diagrammatic plan of the group of machines embodying our invention.

First referring to the diagrammatic plan of Fig. 1, it will be observed that the equipment consists of the following mechanism operated by a single motor, or other prime mover, through shafts connected by gears and other means to cause the various parts of the mechanism to operate in synchronism to automatically assemble lamp parts, bake the basing cement, remove the excess portions of the leads, flux, solder, season and separately eject the good and bad finished lamps from the machine, as an improvement over the use of separate machines for performing the various operations, and the manual transfer of parts or lamps between such machines:

(1) A dual rail gravity bulb chute, which we designate by the reference character 31.

(2) A bulb transfer mechanism 32 between the chute 31 and a sealing machine 33.

(3) A sealing machine 33.

(4) Automatic conveyor mechanism 34 for transferring mounts to a loading turret 35, which feeds them to the sealing machine 33.

(5) A loading turret 35.

(6) Mechanism 36 for transferring sealed bulbs from the sealing machine 33 to an exhaust machine 37.

(7) An exhaust machine 37 for receiving the sealed bulbs from the transfer mechanism 36.

(8) A transfer mechanism 38 for moving the lamps from the exhaust machine 37 to a lead wire straightening conveyor 39.

(9) A lamp conveyor 39 receiving the sealed, exhausted and tipped lamps from the transfer mechanism 38.

(10) Four lead-wire prepositioning devices, generally designated 40, located along the conveyor 39.

(11) A transfer mechanism or turret 41 for receiving lamps from the conveyor 39 and inserting them into bases positioned on a base threading turret 43.

(12) Base-feeding mechanism 42.

(13) An automatic base-threading machine or turret 43, receiving lamps from the transfer device 41 and bases from the base conveyor 42, and uniting said parts.

(14) A transfer and turnover mechanism 44 for transporting base-threaded lamps from machine 43 to the basing machine 45.

(15) A seventy-two head conveyor-type basing machine 45, receiving lamps in associated bases from the transfer and turnover mechanism 44.

(16) Means such as a lamp inspection and packing table (not shown) upon which the good lamps are discharged at station No. "69" of the basing machine 45.

Brief description of operations

Briefly, the sequence of operations of the machine, the sub-combinations of which have been identified, is as follows. An operator transfers bulbs from shipping cartons or the like to the gravity dual-rail bulb feeder 31, which guides them toward and into the pockets of the bulb transfer turret 32. The bulb turret 32, indexing clockwise, as viewed in Fig. 1, conveys each bulb, one by one, to a station where it is monogrammed, and thence to a station where each is transferred to the thirty-six head sealing machine 33.

The mounts are fabricated from component parts, as on an automatic stem and mounting machine (not shown), and the completed mounts automatically transferred to within reach of an operator. The operator inspects such mounts and transfers the good ones to the conveyor mechanism 34, from whence they are automatically transferred to the mount-loading turret 35. The mount-loading turret, indexing clockwise, as viewed in Fig. 1, conveys the mounts one by one to a station where their lead-wires and stem presses are prepositioned. From this station, the mounts are conveyed to a station where they are automatically transferred to a sealing spindle on the sealing machine 33.

The sealing machine 33 is equipped with thirty six sealing heads, each consisting of a sealing spindle which supports a mount, and a holder which supports a bulb. Indexing counterclockwise, as viewed in Fig. 1, it conveys the mount-loaded heads toward the bulb-loading station, and on around through several stations, each equipped with burners appropriately directed toward a bulb in a holder at its place of engagement with a mount to assure proper amalgamation to the flare of said mount and the severance of the cullet from the bulb. The sealed bulb is thereafter subjected to the action of a molding device which accurately forms a shoulder at a prescribed distance above the sealed end of each bulb, and then passes through several bulb-annealing stations to one where the sealed bulb is automatically removed from its head by the transfer mechanism 36. A mount detector device, operated in conjunction with the bulb transfer turret 32, prevents bulbs being loaded onto sealing heads which have not received mounts.

The exhaust machine 37 is equipped with thirty six exhaust ports and indexes counter-clockwise, as viewed in Fig. 1. Located between the sealing machine 33 and the exhaust machine 37 is the transfer mechanism 36 which unloads each sealed bulb from its sealing head and loads it into an exhaust port. A second transfer mechanism 38 unloads each exhausted and tipped-off lamp from an exhaust port and loads it onto the lamp conveyor 39. The conveyor 39 is equipped with mechanism, generally designated 40, which preposition the remote lead wires of the lamps preparatory to automatic assembly with lamp bases.

The base feeding mechanism 42 conveys bases, prefilled with cement, to the base-threading turret or machine 43, which indexes counter-clockwise, as viewed in Fig. 1. This machine is equipped with devices to assure proper seating of each base in its holder and that each base has an unobstructed eyelet. A transfer turret 41 is equipped with vacuum pick-up cups and indexes clockwise as viewed in Fig. 1. Each vacuum cup picks up a lamp from conveyor 39 and lowers it into a base at a station directly opposite and on the base-threading machine or turret 43. The based lamp in turret 43 is indexed to a station where it is automatically picked up by a transfer device 44 and loaded into a head of the basing machine 45. The basing machine is equipped with the necessary cement-baking fires, base air-cooling jets, and lead-wire-positioning, trimming, fluxing and soldering devices. The basing machine 45 is also equipped with the necessary lamp-seasoning and inspection facilities, as well as with a device to separate defective lamps from good ones.

In the present application, the specific description and claims are directed to the transferring of the lamps, which have had their lead wires straightened and threaded into bases, together with associated bases, to the part of the machine in which the basing is completed, the lamps tested, and the good ones separated from those which are inoperative which part of the machine is claimed in U. S. application Serial No. 449,482, filed August 12, 1954, by the same inventors. The remainder of the machine is specifically described and claimed in a copending application Serial No. 449,352 and filed concurrently by the same inventors.

Drive mechanism

The power means for driving the mechanism, heretofore briefly described, and the details of which are most clearly seen in Figs. 2 to 5, incl., consists of an elecric motor or other prime mover 46, connected to the pulley 47 at the side of gear box 48 of the basing machine 45, as by means of a belt 49. Extending from the gear box 48 at right angles to the shaft of the pulley 47, is a shaft 51 driven from said pulley by means of suitable gears in the box 48, but not shown. The right hand end of the shaft 51, as viewed in Fig. 2, connects by means of suitable gears and shafts with the exhaust machine 37 and the sealing machine 33, so that they and the mechanism associated therewith are driven in synchronism with the basing machine 45.

The other end of the shaft 51 is connected to the main drive shaft 52, by means of a suitable clutch mechanism, not shown in detail but generally designated 53, so that it is automatically disconnected in case an accident happens which impedes the operation of the machine, in order to avoid breakage. The main shaft 52 is mounted in bearings 50 carried by the frame of the machine, and carries a spur gear 54 at its left hand end, as viewed in Fig. 2, meshing with a spur gear 55 on a shaft 56 which carries a drive wheel or index cam 57. The cam 57 meshes with a gear 60 formed as series of rollers 58 depending from a spider or wheel 59 on a vertical drive shaft 61 for the basing machine 45. The upper end of the shaft 61 carries a sprocket wheel 62 around which and a corresponding sprocket wheel 62' on a shaft 61' at the other end of the machine 45 passes a chain 63 carrying lamp holders 64.

The shaft 61 is mounted in suitable upper and lower bearings 65 and 66 formed on the frame of the machine. By virtue of the connection between the drive or index cam 57 and the gear 60, the chain 63 is driven step-by-step so that the lamp holders 64 successively index from station to station, as will be understood. This step-by-step drive is not disclosed in detail, as it is similar to the drive disclosed in the Green Patent No. 2,569,852, dated October 2, 1951, the drive cam 57 and gear rollers 58 corresponding respectively with the parts 114 and 113 of said patent.

The shaft 56 has its ends mounted in bearings 67 and 68 carried by the frame of the machine, and its extreme left end, as viewed in Fig. 2, carries a sprocket wheel 69 driving a sprocket wheel 71 by means of a chain 72. The sprocket wheel 71 is mounted on a timing shaft 73, the ends of which are carried in bearings 74 and 75 supported by the frame of the machine.

The right hand end portion of the shaft 52, as viewed in Fig. 2, has fixed thereon a spur gear 76 meshing with an idler spur gear 77. The gear 77 in turn meshes with another idler spur gear 78, journalled on a shaft the ends of which are fixed in the frame of the machine. Through gear 78 motion is transmitted to a spur gear 79 on and adapted to be clutch-connected to, the bulb turnover and transfer mechanism shaft 81, journalled in fixed bearings.

The shaft 81 carries a spur gear 82 adapted to be clutch-connected thereto and meshing with spur gear 83 fixed on shaft 84. The shaft 84 has fixed thereon a bevel gear 85, meshing with a bevel gear 86, fixed on the bottom of a vertical shaft 87 journalled in fixed bearings. The shaft 87 operates shafts 88 and 89 through couplings 91 and 92. The shaft 89 is journalled in fixed bearings and has fixed thereto at its upper end a bevel gear 93, meshing with a bevel bear 94 fixed on the horizontal shaft 95, journalled in fixed bearings.

The shaft 95 has fixed thereon a bevel gear 96 meshing with a bevel gear 97 fixed on the lower end of a vertical shaft 98, journalled in fixed bearings, and having a cam wheel 99 fixed on its upper end engaged by a roller carried by the intermediate portion of a lever, the free end of which is connected to the shaft 102 for raising and lowering the transfer turret 41. Said shaft 95 also carries a transfer turret index cam 101, which engages an indexing gear splined on the turret shaft 102.

The spur gear 83 meshes with an idler spur gear 103 journalled on a fixed stud 104. The gear 103 also meshes with a spur gear 105 fixed on one end of the conveyor cam shaft 106 journalled in fixed bearings 107 and 108. The cam shaft 106 has an extension 109 connected thereto by a coupling 111, and with its other end journalled in a fixed bearing 112.

The cam shaft 106 has fixed thereon an index cam wheel 113, which successively engages rollers outstanding from a wheel to form an indexing gear 114, fixed on a short shaft 115 turnable in fixed bearings. The shaft 115 also has fixed thereon a spur gear 116 meshing with a spur gear 117 fixed on a shaft 118 journalled in fixed bearings. Also fixed on the shaft 118, is the drive sprocket wheel 119 over which passes the lamp carrying chain of the conveyor 39.

The shaft 81 also has a sprocket wheel 70 fixed thereon and meshing with a chain which drives the transfer and turnover mechanism 44. Fixed on the shaft 81 is a cam 80 which operates part of said mechanism 44. The left hand end of the shaft 81 has a bevel gear 121 fixed thereon and meshing with a bevel gear 122 fixed on a shaft 123 journalled in fixed bearings. The shaft 123 is connected by a coupling 124 to a shaft 125 journalled in fixed bearings.

The shaft 125 has fixed thereon an indexing cam 126 engaging rollers 127 rotatably mounted on and depending from a plate, forming a gear 128 fixed on the bottom of a shaft 129, journalled in a fixed bearing, and on the top of which is fixed the base holding turret 131. The shaft 125 also carries a cam 132 which operates means for processing bases, as will be subsequently described. Near the end of the shaft 125 is a sprocket wheel 133, fixed thereon and over which a chain 134 passes for driving the shaft 170 for actuating the base-feeding hopper (not shown).

*The conveyor of the basing machine*

The basing machine 45 has a housing 301 resting on the base or foundation 100 and in which the drive shaft 52 is journalled. Supported on this housing is an intermediate casting 302, which in turn supports a top casting 303 about which conveyor chain 63 moves. See Figs. 6, 9, 10 and 29. The casting 303 carries a top rail 304 an intermediate rail 305, and a bottom rail 306. The last of these rails has two bearing surfaces, a top bearing surface 307 for the lower rollers 308 which support the chain 63, and a lateral bearing surface 309 on which the bottom rollers 311 ride.

The chain 63 is formed as a series of generally trapezoidal frames 312, each comprising an upper element 313, from which outstands a boss 314 receiving a screw or other securing means for holding its lamp holder 64 in place. Its lower element 315 has a pivot member 316 carrying its supporting roller 308, while its lower corners, or where the side sections 317 and 318 meet the bottom section 315, have outstanding bosses 319 and 321, which respectively receive screws or other securing means for holding its lamp holder 64 thereon.

The side section 318 has extending laterally therefrom bearing ears 322 and 323, spaced to receive therebetween the corresponding more-closely-spaced ears 324 and 325 of the trapezoidal frame 312, to which it is directly connected by a pin 326. Each pin 326 carries on its ends a top roller 327 and a bottom roller 311. These rollers 327 and 311 travel on corresponding engaged rearwardly facing surfaces of the top rail 304 and bottom rail 306, respectively. Between each pair of ears 324 and 325 is an intermediate roller 328, which travels on a forwardly facing surface of the intermediate rail 305.

All of the rails are held in place on corresponding flanges of the top casting 303, as by means of set screws 310. Adjusting screws 320 are threaded into the webs of the top casting 303 and their outer ends engage the inner edges of the intermediate rail 305 to move it to a properly adjusted position, where the rollers 327, 328 and 311 are all held in engagement with their rails 304, 305 and 306. The rollers 327, 328 and 311 are of a diameter corresponding with the receiving notches 329 in the sprocket wheels 62 and 62'. The chain 63 is, therefore, driven as the sprocket wheel 62 is turned by the mechanism heretofore described, so that it indexes the lamp holders 64 carried thereby from station to station, in synchronism with the operation of the rest of the machine.

Each lamp holder 64 comprises a bulb-receiving centering and supporting member 331, having the general configuration of an inverted tripod, thereby providing three downwardly converging arms 332, the inwardly facing surfaces thereof affording a centering support for the bowl end of the bulb of a lamp. These arms are evenly spaced angularly of the axis, with the angle between two arms toward the outer or front of the head, and the third arm directly toward the rear of the head. The spread of the front arms is conducive to most convenient introduction of a lamp assembly into the supporting member, as well as a discharge of the lamp therefrom after processing. Said centering and supporting member 331 is fixed, as by a shoulder 333 thereunder and a set screw 334 to the upper end of a slide rod 335. The rod 335 is movable vertically in appropriately spaced bearing lugs 336 and 337 of the body member or casting 338 of each lamp holder 64. Each casting 338 is carried by one of the trapezoidal frames 12 each of which is a link of the chain 63, as by means of the screws or other connecting means heretofore mentioned and passing through apertures in bosses 330 thereof (see Fig. 7).

The rod 335 and its member 331 are spring-biased upwardly in any convenient manner, as by means of an adjustably-mounted winged collar 339 on said rod between said bearing lugs 336 and 337. Said collar 339 has upward resilient pressure applied thereto by a coiled spring 341 encircling the rod 335 and resting on the lug 337. Adjustment of the collar 339 may be obtained by the provision of a plurality of apertures in the rod through a selected one in which passes a pin 342. At one end of the pin may be provided a latch of any desired character to hold it from sliding out inadvertently. The pin is positioned to correspond with the size of the lamp to be supported.

As a further function of the winged collar 339, one of the wings thereof, designated 343, has a forked outer end riding on a guide 344 parallel to the rod 335 to keep the collar and rod from rotating. The other wing carries a roller 346. The axis of the roller is perpendicular to the rod 335. Said roller is engageable by actuating mechanism to be subsequently described. An important feature of the lamp holders 64 is the provision of means for receiving, locating, aligning and seating the base end of a lamp assembly. As the machine operates with the base ends of the lamps projecting upwardly, reference to the upper end of the lamp is synonomous with the base end thereof.

The casting 338 is shaped generally as a segmental part of a hollow cylinder coaxial with the axis of the rod 335 and projecting upwardly from the level of the upper lug 336. The upper end of the casting is flanged, as indicated at 347, and on this flange is secured a cap 348. The front of the cap is cut-away to provide an opening permitting lateral introduction of the upper end of a lamp assembly. The inside face of the cap 348 is generally frusto-conical or sloped from a bottom relatively large diameter to an upper smaller diameter. The front edges of this cap where cut away likewise slope so that the cut-away at the bottom of the cap is more than 180°, whereas the cut-away at the top of the cap is less than 180°. The diameter of the inside surface of the cap at its upper end approximates the diameter of the base, so that when the base approaches said upper end, it cannot fall forwardly out of the cap opening, and when the base is closer to the bottom of the cap, there is an opening large enough for insertion and removal in a lateral direction.

The upper end of the cap 348 has its inside surface formed as a continuation of the slope heretofore disclosed, and is of a dimension and shape to constitute a ledge 349 with which the end rim of a base comes into centered and seating engagement when the lamp assembly is pushed upwardly thereagainst. The cap is upwardly open within the inner circumference of the ledge, so the center of the base is accessible for processing.

At station "1," the slide rod 335 is operated by a rod 351, slidably mounted for vertical reciprocation in one groove 350 a duplex guide casting 352, supported by the housing 353 of the transfer and turnover mechanism 44. Both grooves of the casting are closed by a cover plate 360 secured to the casting in any desired manner. This rod 351 carries a head 354, secured thereto as by means of a pin 355. This head has a lip 356 which is sequentially engaged by the rollers 346, as the lamp holders 64 index at station "1," whereby reciprocation of the rod 351 controls the elevation of the supporting member 331.

The lower end of the rod 351 is pivoted to the top of a connecting link 357 as indicated at 358. The lower end of the link 357 is, in turn, pivoted to a crank 359, as indicated at 361. The crank 359 is secured to an operating shaft 362 also carrying a crank 363. On the free end of the crank 363 is a roller 364, received in the groove 365 of a box cam 366, secured to the drive shaft 52, as by means of a key 367. By virtue of this construction, the supporting member 331 moves up and down at station "1" to cooperate with the other lamp processing mechanism which will now be described.

*The transfer and turnover mechanism*

The lamps are transported from the base-threading machine 43 to the basing machine 45 by mechanism most clearly illustrated in Figs. 6 to 9, and 11 to 19, inclusive. This transfer and turnover mechanism comprises four pairs of bell-crank levers 368 and 369. These pairs are carried by a corresponding number of housings 398, in turn carried by a transfer and turnover wheel 399. Each pair of levers is pivoted to one of the housings 398, as indicated at 372 and 373. The lamp engaging portions 374 and 375 of said levers are pivoted thereto about transverse axes, as indicated at 371, formed of non-metallic material such as micarta carrying bulb engageable pads of sponge rubber, in order to avoid breakage of the lamp bulbs on impact therewith, and resiliently restrained by leaf springs 380, secured to the levers as illustrated in Figs. 16 and 17.

Figure 11:
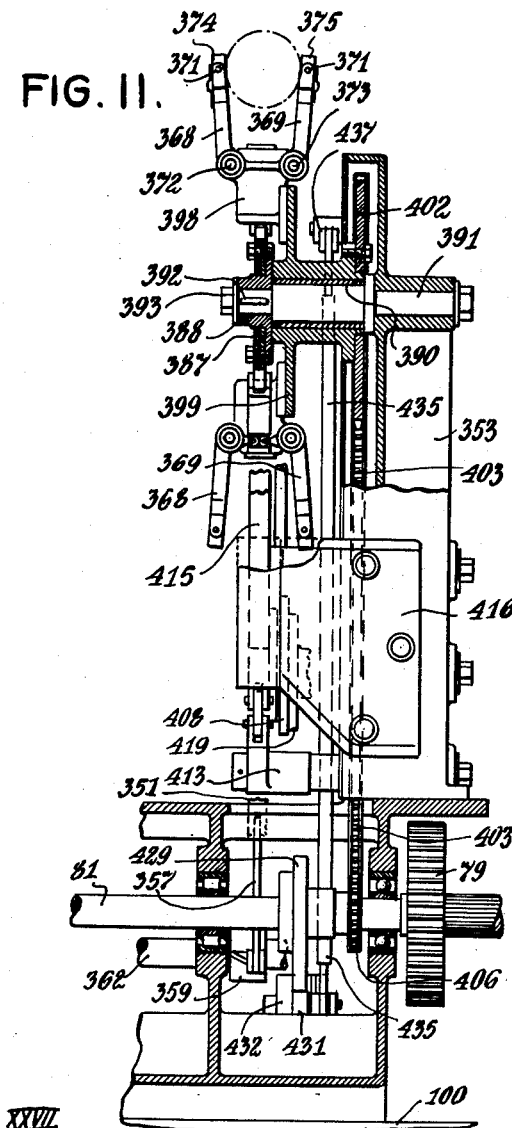
Fig. 11 is a fragmentary side elevational view, with parts in section on the line XI—XI of Fig. 6, in the direction of the arrows.
Figure 12:
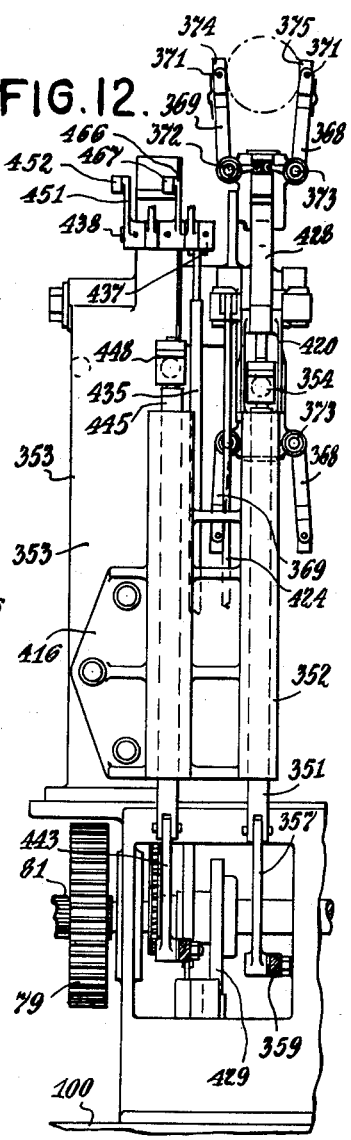
Fig. 12 is an opposite side elevational view on the line XII—XII of Fig. 6, in the direction of the arrows.
Figure 24:
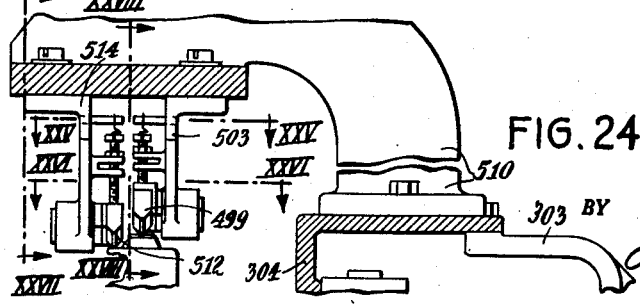
Fig. 24 is an end elevational view of the flashing or seasoning mechanism, with parts in section on the line XXIV—XXIV of Fig. 1, in the direction of the arrows.

The levers 368 and 369 comprise portions 376 and 377 angularly disposed with respect to the main lamp-gripping arm portions, and respectively carrying rollers 378 and 379, received in a slot 381 of a yoke 382. The yoke 382 has adjustably connected thereto an operating member 383, as by means of bolts 384 passing through slots therein and threaded into the yoke 382. The member 383 carries a roller 385, pivoted thereto as indicated at 386. The roller 385, for each pair of levers 368 and 369, rides on an adjustable cam 387, consisting of two plates held together in a selected position and to a hub 388, as by means of bolts 389. The hub 388 is fixedly mounted on a stationary supporting shaft 391 as by means of a key 392 and a nut 393. The shaft 391 is supported by and secured to the housing 353 as illustrated in Fig. 11.

The yokes 382 and their rollers 385 are biased into engagement with the cam 387, as by means of springs 394 mounted in pockets 395 in the housings 398, and with their inner ends engaging depending studs 396, one on each yoke 382. The outer ends of the springs are held under the desired amount of compression by means of overlying plates 397, secured to the outer faces of the housings 398. The housings 398 are secured to the transfer and turnover wheel 399 as by means of screws 401. The wheel 399 is pivotally mounted on a bushing 390 on the shaft 391 and its hub is extended and carries a sprocket wheel 402. The sprocket wheel 402 carries a chain 403 which passes from there about a sprocket wheel 404 on cam shaft 405, fixed to the housing 353, as viewed in Fig. 14, and a sprocket wheel 406 on shaft 81. An idler sprocket wheel 407, also mounted in the housing 353 as viewed in Fig. 14, serves as a tightener for the chain 403.

The shaft 405 carries a base ejector cam 408, adjustably secured to a hub 400, as viewed in Fig. 14, engaged by a roller 409 on the shorter arm 411 of a bell crank lever 412. The longer arm 413 of said lever, which oscillates about a fixed pivot 414, is pivotally connected to a rod 415 slidably mounted in a casting 416 secured to the side of the housing 353, through the intermediate link 417. The upper end of the rod 415 (Fig. 6) carries a base ejector member 418, which at station "j" reciprocates in the base receiving pockets or cups 268 of the base-threading machine 43, as said pockets respectively index thereat. This movement loosens the bases and starts them along with the connected bulbs, as said bulbs are successively picked up by the levers 368 and 369. If, perchance, a base should be there without a bulb, then the member 418 merely loosens said base for subsequent removal at the next station of the base-threading machine, either manually or by a member 410, like 418, only extending higher and operating simultaneously therewith as by being branched from the rod 415, in each base cup 268 as it indexes at station "k."

The shaft 405 also carries a discharge cam 419, also adjustably secured to said hub 400, as shown in Fig. 14, and likewise is driven by the chain 403. Said cam engages a roller 421 on an operating lever 422, oscillatable about a fixed pivot 423, secured to the housing 353 as viewed in Figs. 6 and 13. The free end of the lever 422 is connected to a rod 424 by means of a pivot pin 425. The other end of the rod 424 is pivoted to the free end of a lever 426, which oscillates about a fixed pivot 427 in a bracket 420 formed on top of the guide casting 352, and carries a spring member 428 which serves to push a lamp from the full line position to the dotted line position, as viewed in Fig. 6. The sprocket wheel 406 on the shaft 81 serves to drive the chain 403 and thereby operate the respective sprocket wheels and their connected cams and other mechanism.

*The side-lead-wire-pulling mechanism*

This shaft 81 also carries a cam 429 which is engaged by a roller 431 on an operating lever 432, biased into engagement with said cam by a spring 433. The lever is mounted on a bearing member fixed to the housing 353 by means of a pivot 434, and secured to the lower end of an operating rod 435 by means of a pivot pin 436. The upper end of the rod 435 is pivoted to a bell crank lever 437 which is mounted on a shaft 438 journalled in the housing 353, and serves to operate the side-lead-wire-pulling mechanism at station "2," most clearly illustrated in Figs. 7, 8, 11, 12, 13, 14, 15, 20, 21, 22, 23 and 29.

In order to slightly lower the lamp-supporting member 331 at station "2," in order to loosen the grip on a supported lamp 143, a cam 439 is provided on shaft 52, which engages a roller 441 on a lever 442. The lever 442 is pivoted on the shaft 362 and its arm remote from the cam 439 is pivotally connected to the lower end of a link 443, as indicated at 444. The upper end of the link 443 is pivoted to the lower end of a rod 445, as indicated at 446. Said rod 445 is slidably mounted for vertical reciprocation in the other groove 447 in the duplex casting 352.

The rod 445 carries a head 448, like the head 354 and secured to said rod as by means of a pin 449. This head has a lip, like the lip 356 of the head 354, which is sequentially engaged by the rollers 346 as the lamp holders 64 index at station "2." Thus reciprocation of the rod 445 serves to slightly loosen the grip of the supporting member 331 at station "2," so that pulling on the side lead wire of a lamp there supported, causes said lamp to turn slightly, if necessary, so that said wire is exactly at the side, ready to be fluxed and soldered at the appropriate stations.

The mechanism for pulling on a side lead wire of a lamp 143 at station "2," including means for lifting said wire to approximately horizontal outstanding position, comprises a crank 451 secured to said shaft 438 and carrying a roller 452. The shaft 438 is journalled in a wire positioner support bracket 453, secured to the housing 353 as by means of bolts 354. Pivoted to the side of the housing 453, as indicated at 454, is a wire positioner lever 455, carrying a blade 456, adapted, to be oscillated from the position illustrated in Fig. 22, to one thereabove where it engages the side lead wire of a lamp and moves it to generally-horizontal position, if such is necessary.

The lever 455 carries a laterally-projecting stud or slide block 457 received in a slot 458 in a lever 459 provided with a depending cam 461, formed as illustrated in Figs. 7 and 22. The lever 459 is pivoted to the support bracket 453 as indicated at 462. The lever 455 is normally held in its lowermost position, as illustrated, by means of a spring 463 extending from an outstanding stud 464 thereon to a stud 465 outstanding from the bracket 453. The lever 455 is moved up and down as the bell crank lever 437 is oscillated, by movement of the roller 452 thereunder, thereby causing corresponding oscillation by movement of the lever 459 and engagement of the slotted portion thereof with the slide block 457 secured to the lever 455.

The shaft 438 also has a lever 466 fixed thereto and carrying a roller 467 pivoted thereon. This roller is received between lugs 468 and 469 depending from a wire positioner slide member 471. This slide member is received in a dovetail groove 472 in the bracket 453, and held in position by means of a slide gib 473 secured to said bracket, as by means of bolts 474. Upstanding from the slide 471 is a pivot stud 475, about which wire positioner jaws 476 and 477 are pivoted. These jaws are held in normally closed or engaging relationship by means of a coil spring 478 extending from an upstanding pin 479 on the jaw 476, and the top of an angular pin 480 extending from one side of the jaw 477. Opening and closing of the jaws is effected, as they oscillate horizontally, by a spreader cam 482, mounted on the bracket 453, and adapted to separate the rollers 483 and 484, respectively mounted on rearward extensions from the jaws 476 and 477, as said jaws move to the right as viewed in Figs. 7, 8, 20 and 22. Said jaws tend to close under spring action as they move to the left.

It will be understood that more than a mere opening and closing of the jaws is necessary in order to accomplish the function of pulling a lead wire to the right an appreciable distance and then releasing it. To accomplish that purpose, we provide for the necessary time delay in opening the jaws by having a toggle between the forward or left hand ends of the jaws 476 and 477. Said toggle comprises links 485 and 486, pivoted respectively to the jaws 476 and 477, as indicated at 487 and 488, and to one another by a pin 489. The pin 489 is extended upwardly a considerable distance, as viewed in Figs. 7 and 22, for a purpose which will be explained. The links 485 and 486 are respectively inset into their jaws so as to be engaged by shoulders 491 and 492 on said jaws which prevent them from springing to the left to a position beyond that illustrated in Figs. 8 and 20. In other words, when in such position the toggle is locked and the jaws held open even under spring action.

In order to break the toggle to the right and cause the jaws 476 and 477 to snap shut about a side lead wire, after the latter has been moved to approximately horizontal position by the blade 456, we provide an adjustable stop 493 extending to the right from the lamp stop 494, and in line with the stud 489, so as to be engaged thereby when the slide 471 moves to the extreme left hand position. The lamp stop 494 is, in turn, held in position on the bracket 453 by means of a stud 495 extending from a flange of a small bracket 497, and gripped between depending bifurcations of a block 496, the right hand ends of which, as viewed in Fig. 22, being secured as by welding to said flange. Screws 500 serve to adjust the tightening action of the blocks on the stud 495 for bracing it. The bracket 497 is secured to an upstanding flange of the bracket 453 as by means of bolts.

In order to move the toggle to the position illustrated in Figs. 8 and 20, after it has been broken to the right, we provide an adjustable stop 498 projecting through and from the bracket 497 and in line with the stud 489. Thus, upon movement to the right, the jaws 476 and 477 are, after engagement with the spreader 482, first opened and then the toggle which opens therewith is finally moved to the position illustrated in Figs. 8 and 20, by engagement of the stop 498 with its stud 489. Thus oscillation of the slide 471 effects opening of the jaws, gripping of the lead, pulling on said lead to if necessary adjust the position of the lamp so that said lead extends exactly from the side thereof, and finally releasing the lead after such adjustment is effected.

More in detail, in the position shown in Figs. 8 and 20, the jaws have been retracted, opened by the spreader cam and the toggle has been pushed forward to locked position by the rear stop. As the slide 471 is moved forward or toward the left, the rollers 483 and 484 on the extensions of the jaws, first pass off the jaw opener cam 482, but the jaws stay open because of the toggle being locked, until the toggle stud 489, guided in a groove 490 formed between the lower portions of the block 496, is engaged by the front stop 493. This front stop breaks the toggle to the rear, allowing the jaws to be snapped shut by the spring 478 on the side lead of an indexed lamp. On the rearward movement, the jaws pull back on the lead until they are opened by the spreader cam 482. Finally, the rear stop 498 engages the toggle stud 489 and breaks the toggle forwardly to initial locked position.

*Baking, wire-positioning, fluxing, soldering and seasoning*

After an indexed lamp 143 has had its side lead wire pulled out straight and the lamp, if necessary, adjusted so that said wire is exactly at the side, said lamp passes on through stations "3" to "32" incl. where the basing cement is baked to permanently secure the base to the lamp bulb. As the lamps reach station "35," the top and side lead wires are guided to the proper positions for subsequent processing. Upon reaching station "37," the top and side wires are simultaneously cut off short. At station "38," the side wire is pushed against the side of the base, while at this station through station "44" soldering burners are employed for heating the bases of lamps thereat. At station "39" the side wire is fluxed and at station "41" it is soldered. At station "42," the top wire is fluxed and at "44," said top wire is soldered. Upon reaching station "46" each bulb is flashed or seasoned until reaching station "67."

The apparatus for effecting the flashing or seasoning of lamps is most clearly illustrated in Figs. 24 to 28, inclusive and claimed in U. S. application Serial No. 517,586, filed June 14, 1955, by the same inventors. Seasoning electric current is introduced to each lamp, as it is indexed at the flashing or seasoning stations, by means of contacts 499 supported on, but insulated from, mounting levers 501. These levers are pivoted, as indicated at 502, to brackets 503 supported from a casting 510, in turn supported from the top rail 304 carried by the top casting 303 of the basing machine 45, as by means of bolts.

Each lever 501 is biased so that its contact 499 is pressed into engagement with the center contact of an indexed lamp 143 as by means of a coil spring 504. Excess movement of each lever under spring action is prevented by a stop screw 505, threaded through arms 506 and 507 projecting from the bracket 503. Each stop screw is locked in adjusted position by means of set screw 508, which is adapted to pull the arms 506 and 507 together to prevent undesired stop screw movement. Current is introduced to the contacts 499, as by means of an insulated wire 509 connected thereto as by means of a screw 511. The contacts 499 each have angular bottom faces, as viewed most clearly in Fig. 28, so that each lamp 143 as it indexes rides under the contact member at the particular station and elevates it to a slight extent against the action of its spring 504.

The contacts 512 for the return current from the lamps 143 are as shown most clearly in Fig. 27. Each contact 512, like the contacts 499, is carried by a lever 513 but not insulated therefrom. Each lever 513 is pivoted to a bracket 514, as indicated at 515, said brackets being also supported by the casting 510, as by means of bolts. Each lever 513 is biased by a coil spring 516, but restrained from undesired movement by means of a stop screw 517, threaded through arms 518 and 519, projecting from the bracket 514, and locked in adjusted position as by means of a set screw 521.

It will, therefore, be understood that the contacts 514, being shaped like the contacts 499, ride over the shells of lamp bases as the lamps index at the seasoning stations. Said seasoning current thus passes at each seasoning station from a contact 499 to the center contact of an indexed lamp 143, through the filament, back from the shell of said lamp to a contact 512, from whence it passes to the frame of the casting 510, grounded as indicated at 522.

*The mechanism for discharging lamps from the basing machine*

When the lamps are indexed at station "69," each successfully seasoned without failure is discharged from the basing machine 45 to a chute 523. The mechanism for effecting this discharge, as well as the discharge of lamps with broken filaments or otherwise defective or opencircuited at the following station "70," to the chute 523, is most clearly illustrated in Figs. 9 and 29 and claimed in U. S. application Serial No. 517,587, filed June 14, 1955, by the same inventors. At station "69" there is provided a rod 525 slidably mounted for vertical reciprocation in a bracket 526 secured to the housing 301, as by means of bolts. This rod 525 has pivoted to its lower end a hook 527, as indicated at 528. The hook is biased into latching engagement with a slide rod 529 having a hooked upper end 531, as by means of a coil spring 532.

Under normal conditions, the rod 525 reciprocates to pull down on the roller 346 which rides under the lip 533 of its head 534, secured thereto as by means of a set screw 530, and release a lamp supported by the member 331 of a lamp holder 64 indexed thereat. This allows said lamp to be discharged at station "69" into the chute 523 by means of a blast of air from the nozzle 535 at station "69" against the upper end of the lamp neck, through aperture 536 in the cap 348. Restriction of the blast of air to that part of the cycle, where discharge of a lamp 143 is desired, is effected by a cam 524 on shaft 56 (Fig. 2), or turned thereby, acting to open valve 540 in the air line to nozzles 535 at both of the stations "69" and "70." This releasing action is effected by a crank 537 fixed on the operating shaft 362, the free end of which is pivoted to the slide rod 529, guided in a bracket 546 secured to the base 100 of the machine as by means of bolts, as indicated at 538. It will be understood that the shaft 362, as previously mentioned, is oscillated by means of the cam 366 on the shaft 52.

If the lamp is defective, oscillation of the rod 525 is prevented by a release of the hook 527 by means of a solenoid 539. The armature 541 of the solenoid is connected to the normally horizontal arm 542 of a bulb crank lever 550, as by means of a pivot 543, through the intermediary of a link 544. The lower end of said link is directly pivoted to the armature, as indicated at 545. The bell-crank lever 550 is pivoted to the bracket 546, as by means of a pivot 547, and its other arm 548 carries a pin 549 slidable in a slot 551 in the hook 527.

Thus upon an inoperative lamp indexing at station "68," the solenoid 539 is energized to disengage the hook 527 from the hooked upper end of the slide 529, against the action of the spring 532. The slide rod 525 is thus released and moved upward by action of the coil spring 552 on a stud 553 carried thereby. The upper end of said spring is anchored to a stud 554 on the bracket 526. By virtue of this operation, a bad lamp is not discharged at station "69" but allowed to be carried to station "70." There is a slide rod 555 at station "70" similar to the slide rod 525, and carrying a lipped head 556 which pulls down on the roller 346 and there releases the bad lamp. The rod 555 is operated by means of a link 557, the upper end of which is pivoted to the lower end of the rod 555, as indicated at 558, and the lower end of which is pivoted to a crank 559 fixed on the operating shaft 362, as indicated at 561.

The control circuits for detecting bad lamps

Figure 30:
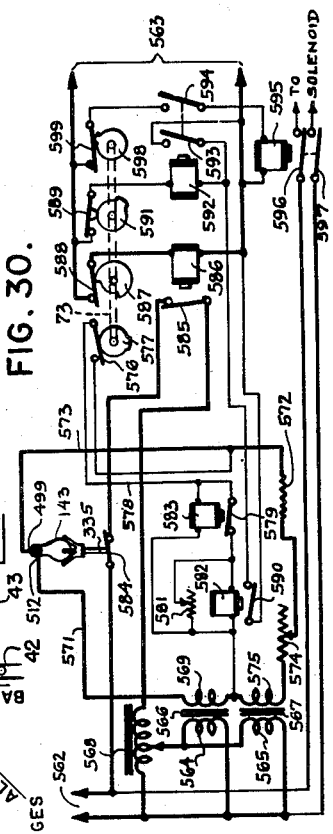
Fig. 30 is a wiring diagram.
Figure 31:
Fig. 31 is a chart indicating the sequence of operation of the switches of Fig. 30.

The circuits controlling the detection and separation of bad lamps from good lamps are illustrated in Fig. 30. Fig. 31 is a diagram showing the sequence of operation of the cam-control switches of said circuits. The cams controlling said switches are shown in Fig. 2 as mounted on cam shaft 73.

There are two sources of power for the circuits of Fig. 30, a relatively high voltage source 562, which may be 220 volts, and a relatively low voltage source 563, which may be 110 volts. Adapted to be energized from the high voltage source are the primary windings 564 and 565 of transformers 566 and 567 through an adjustable impedance or voltage divider 568. The circuit to these windings is through a normally-open lamp-controlled switch 584 and a normally-open solenoid-controlled switch 585. The secondary winding 569 is to energize a detector circuit through a lamp when indexed at station "68." In other words, a line 571 from this winding may go to a contact 512 at said station and a line from contact 499 at said station may be connected to a resistor 572 through line 573. Said resistor 572 is connected through an adjustable resistor 574 to the secondary winding 575 of transformer 567.

These circuits from the secondary windings 569 and 575 form part of a Wheatstone bridge which also comprises a circuit including normally-open switch 576 adapted to be closed by cam 577 on the cam shaft 73, after a lamp has indexed at position 68 and said shaft has turned through the angle represented in Fig. 31, that is, more than 90°. Upon closing of the switch 576, a circuit may be initiated if the resistance of the lamp 143, detected at station "68," does not balance the resistors 572 and 574, as it would if in normal condition. In other words, if the lamp at station "68" is of abnormal resistance or open circuited, a circuit is established upon closing of the switch 576 through line 578, normally closed switch 579, adjustable resistor 581 and solenoid 582 in parallel, to the mid-point between secondary windings 569 and 575. An overload release solenoid 583 is also provided to open switch 579, as a protection to solenoid 582, in case an excessive voltage is developed upon closing the switch 576.

Starting with a position where a lamp 143 has reached station "68" and the thereby lowered slide rod 335 of its lamp holder 64 has closed switch 584, switch 585 is closed by solenoid 586 when cam 587 closes its switch 588, immediately after indexing and until the next indexing position is reached, as indicated by Fig. 31. This action connects the transformers 566 and 567 for energizing the circuits.

At station "68," when the switch 588 is closed immediately after indexing, the normally-closed switch 589, operated by cam 591, is also in closed position. This means that the solenoid 592 is energized, only if there is a bridge unbalance causing closing of the switch 590 by solenoid 582, closing both of the switches 593 and 594. Switch 593 establishes a holding circuit by shorting the switch 590, and the closing of the switch 594 establishes a circuit to the solenoid 595 ready to close the switches 596 and 597 to energize the solenoid 539 controlled thereby, upon the cam 598 turning further. At station "69," the cam 598, immediately after indexing, momentarily closes its switch 599 and energizes solenoid 539 to insure that a bad lamp so detected is not discharged at station "69," but rather retained for discharge at station "70." Upon the cams turning a little further, normally closed switch 589 is opened, breaking the holding circuit and restoring the switches to starting position.

It will thus be seen that a good lamp upon reaching station "68" is discharged at the next station by virtue of the fact that the bridge circuit through solenoid 582 is not energized, whereby the solenoid 539 remains de-energized. However, if the lamp at station "68" is defective, such as being open circuited or otherwise abnormal, so that its resistance does not balance the resistors 572 and 574, a circuit is put in condition for being established at station "69" by means of cam 598 energizing the solenoid 539, for preventing discharge of the bad lamp until it reaches station "70."

Operation

From the foregoing description, it will be seen that after lamps 143 and their associated bases 190 have been indexed at station "j" on the base-threading machine 43, each is picked up by the bell-crank levers 368 and 369 of the transfer and turnover mechanism 44, and placed bowl-end down in a lamp holder 64, while indexed at station "1" of the basing machine 45, the slide rod 335 having been lowered so that the supporting member 331 is in position for receiving such a lamp. After the lamp is placed, it is pushed back into position at the back of the holder 64.

At station "2," the supporting member 331 is slightly lowered while the side lead wire, raised to generally horizontal position, is pulled to, if necessary, slightly twist the lightly held lamp so that the wire is exactly at the side thereof, ready for subsequent trimming, fluxing and soldering operations.

The lamp is then transported through stations "3" to "32," inclusive where baking fires heat its base cement to firmly attach the base thereto. The lamp then passes on through station "35" where the top and side wires are guided to desired positions, station "37" where the top and side wires are trimmed off, station "38" where the side wire is pushed against the base, station "39" where the side wire is fluxed, station "41" where the side wire is soldered, station "42" where the top wire is fluxed, and station "44" where the top wire is soldered. Upon reaching station "46," flashing or seasoning of the lamp is started and continued through station "67." At station "68," the lamp is detected and, if defective, a circuit is conditioned for preventing discharge at the succeeding station "69," whereby bad lamps are separated from good lamps by not being discharged until station "70" is reached.

Although a preferred embodiment has been disclosed, it will be understood that modifications may be made within the spirit and scope of the invention.

We claim:
1. In apparatus of the character described, mechanism for transferring while turning-over lamps and associated bases from a base-threading turret to a lamp holder on a basing machine, said mechanism comprising a series of pairs of bell-crank levers carried by a corresponding number of housings, said housings in turn being carried by a transfer-and-turnover wheel pivoted about a horizontal axis to rotate in a vertical plane, means pivoting said levers, one pair to each housing, lamp engaging portions on the outwardly-extending arms of said levers being pivoted about axes transverse to said arm portions and formed of resilient material to avoid breakage of the lamp bulbs by impact therewith, means resiliently restraining said lamp-engaging portions with respect to said arms, portions of said levers extending angularly from said outwardly-extending arms adjacent their pivot points and carrying rollers, a yoke for each pair of levers and with a slot in which said rollers are received, an operating member connected to each yoke and carrying a roller, a stationary cam engaged by said rollers, and means resiliently biasing said rollers into engagement with said cam whereby, upon turning said wheel, said levers close about and grip a lamp, turning it over as it is moved in a vertical plane by rotation of said wheel and placing it bowl side down in a lamp holder on said basing machine.

2. In apparatus of the character described, mechanism for transferring while turning-over lamps and associated bases from a base-threading turret to a lamp holder on a basing machine, said mechanism comprising a drive shaft, a series of pairs of bell-crank levers carried by a corresponding number of housings, said housings in turn being carried by a transfer-and-turnover wheel, means pivoting said levers, one pair to each housing, lamp-engaging portions on the outwardly-extending arms of said levers being pivoted about axes transverse to said arm portions and formed of resilient material to avoid breakage of the lamp bulbs by impact therewith, means resiliently restraining said lamp-engaging portions with respect to said arms, portions of said levers extending angularly from said outwardly-extending arms adjacent their pivot points and carrying rollers, a yoke for each pair of levers and with a slot in which said rollers are received, an operating member connected to each yoke and carrying a roller, a stationary cam engaged by said rollers, means resiliently biasing said rollers into engagement with said cam whereby, upon turning said wheel, said levers close about and grip a lamp, turning it over and placing it bowl side down in a lamp holder on said basing machine, and means for thereafter pushing said lamp back into said holder, comprising a cam driven by said shaft, an operating lever oscillatable about a fixed pivot, a rod pivotally connected to the free end of said lever, a spring pusher member, a lever carrying said spring member, and means pivotally connecting said lever and rod.

3. In apparatus of the character described, in combination with a basing machine having a conveyor with a series of lamp holders, mechanism for transferring, while turning-over, lamps and associated bases from a base-threading turret to a lamp holder on said conveyor, comprising a foundation, a housing resting thereon, a top casting supported above said housing, top, intermediate and bottom rails carried by said top casting, an inwardly facing bearing surface on said top rail, an outwardly facing bearing surface on said intermediate rail, and top and inwardly facing bearing surfaces on said bottom rail, normally vertical shafts, one at each end of said top casting, sprocket wheels fixed for rotation with said shafts, said conveyor comprising a chain carried by said sprocket wheels and movable about said top casting, means for intermittently driving one of said sprocket wheels to cause the lamp holders on said conveyor to index successively through a series of stations therealong, means for transferring and turning over lamps and associated bases from a base-threading turret to a lamp holder on said basing machine, comprising a series of pairs of bell-crank levers carried by a corresponding number of housings, said housings in turn being carried by a transfer-and-turnover wheel, means pivoting said levers, one pair to each housing, lamp engaging portions on the outwardly-extending arms of said levers being pivoted about axes transverse to said arm portions and formed of resilient material to avoid breakage of said bulbs by impact therewith, means resiliently restraining said lamp engaging portions with respect to said arms, portions of said levers extending angularly from said outwardly extending arms adjacent said pivot points and carrying rollers, a yoke for each pair of levers and with a slot in which said rollers are received, an operating member connected to each yoke and carrying a roller, a stationary cam engaged by said rollers, means resiliently biasing said rollers into engagement with said cam whereby, upon turning said wheel, said levers close about and grip a lamp on said base-threading turret, turning it and its associated base over, and placing it bowl side down in a lamp holder on said basing machine.

4. In apparatus of the character described, in combination with a basing machine having a conveyor with a series of lamp holders, mechanism for transferring, while turning-over, lamps and associated bases from a base-threading turret to a lamp holder on said conveyor, comprising a foundation, a housing resting thereon, a top casting supported above said housing, top, intermediate and bottom rails carried by said top casting, an inwardly facing bearing surface on said top rail, an outwardly facing bearing surface on said intermediate rail, and top and inwardly facing bearing surfaces on said bottom rail, normally vertical shafts, one at each end of said top casting, sprocket wheels fixed for rotation with said shafts, said conveyor comprising a chain carried by said sprocket wheels and movable about said top casting, means for intermittently driving one of said sprocket wheels to cause the lamp holders on said conveyor to index successively through a series of stations therealong, means for transferring and turning over lamps and associated bases from cups on a base-threading turret to a lamp holder on said basing machine, comprising a series of pairs of bell-crank levers carried by a corresponding number of housings, said housings in turn being carried by a transfer-and-turnover wheel, means pivoting said levers, one pair to each housing, lamp engaging portions on the outwardly-extending arms of said levers being pivoted about axes transverse to said arm portions and formed of resilient material to avoid breakage of said bulbs by impact therewith, means resiliently restraining said lamp engaging portions with respect to said arms, portions of said levers extending angularly from said outwardly extending arms adjacent said pivot points and carrying rollers, a yoke for each pair of levers and with a slot in which said rollers are received, an operating member connected to each yoke and carrying a roller, a stationary cam engaged by said rollers, means resiliently biasing said rollers into engagement with said cam whereby, upon turning said wheel, said levers close about and grip a lamp on said base-threading turret, turning it and its associated base over, and placing it bowl side down in a lamp holder on said basing machine, means driven simultaneously with said transferring and lamp-turning-over, means comprising a rod which reciprocates in a base receiving cup on said base-threading turret to loosen each base, and means operating simultaneously with said rod for removing any base in such a cup when indexed at the next station.

References Cited in the file of this patent

UNITED STATES PATENTS

| | | |
|---|---|---|
| 1,619,729 | Howard | Mar. 1, 1927 |
| 2,112,621 | Henszey et al. | Mar. 29, 1938 |